US012443027B2

(12) United States Patent
Matsuyama et al.

(10) Patent No.: US 12,443,027 B2
(45) Date of Patent: Oct. 14, 2025

(54) PHOTOELECTRIC CONVERSION DEVICE, CAMERA MODULE, ENDOSCOPE, ENDOSCOPE SYSTEM, AND APPARATUS

(71) Applicant: CANON KABUSHIKI KAISHA, Tokyo (JP)

(72) Inventors: Kazunori Matsuyama, Kanagawa (JP); Noriyuki Shikina, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 18/539,789

(22) Filed: Dec. 14, 2023

(65) Prior Publication Data
US 2024/0111146 A1    Apr. 4, 2024

Related U.S. Application Data

(63) Continuation of application No. PCT/JP2022/019793, filed on May 10, 2022.

(30) Foreign Application Priority Data

Jun. 22, 2021   (JP) .................................. 2021-103548

(51) Int. Cl.
G02B 23/24     (2006.01)
H04N 25/74     (2023.01)
(Continued)

(52) U.S. Cl.
CPC ......... *G02B 23/2484* (2013.01); *H04N 25/74* (2023.01); *H04N 25/772* (2023.01); *H10F 77/95* (2025.01)

(58) Field of Classification Search
CPC .. G02B 23/2484; H04N 25/74; H04N 25/772; H04N 23/555; H04N 25/7795;
(Continued)

(56) References Cited

U.S. PATENT DOCUMENTS 10,389,964 B2   8/2019  Taniguchi
10,659,713 B2   5/2020  Shikina
(Continued)

FOREIGN PATENT DOCUMENTS

JP   2008-306695 A   12/2008
JP   2012-099909 A    5/2012
(Continued)

OTHER PUBLICATIONS

Search Report dated Feb. 28, 2025, in European Patent Application No. 22828085.5.
(Continued)

*Primary Examiner* — Michael E Teitelbaum
(74) *Attorney, Agent, or Firm* — Venable LLP

(57) ABSTRACT

A photoelectric conversion device is provided. The device includes a pixel array in which pixels are arranged, a drive controller configured to drive the pixel array, a horizontal transfer unit configured to sequentially output analog signals respectively output from columns of the pixel array, an AD converter configured to convert an analog signal output from the horizontal transfer unit into a digital signal, a first clock generator configured to generate a clock signal used to control an operation of the drive controller, and a second clock generator configured to generate a clock signal used to control the horizontal transfer unit and the AD converter. A clock tree in which a clock signal is distributed from the first clock generator and a clock tree in which a clock signal is distributed from the second clock generator form clock trees different from each other.

22 Claims, 14 Drawing Sheets

(51) Int. Cl.
*H04N 25/772* (2023.01)
*H10F 77/00* (2025.01)

(58) Field of Classification Search
CPC ...... H04N 25/617; H04N 25/78; H10F 77/95; A61B 1/051
See application file for complete search history.

(56) References Cited

U.S. PATENT DOCUMENTS

| | | |
|---|---|---|
| 11,202,023 B2 | 12/2021 | Shigiya |
| 11,303,829 B2 | 4/2022 | Shigiya |
| 11,490,041 B2 | 11/2022 | Shigiya |
| 11,516,420 B2 | 11/2022 | Kato |
| 11,595,606 B2 | 2/2023 | Shikina |
| 11,627,264 B2 | 4/2023 | Igarashi |
| 11,700,467 B2 | 7/2023 | Shikina |
| 11,758,296 B2 | 9/2023 | Shikina |
| 11,856,308 B2 | 12/2023 | Osawa |
| 11,889,213 B2 * | 1/2024 | Yasu .................... H04N 25/671 |
| 2002/0015191 A1 * | 2/2002 | Muramatsu ............ H04N 25/00 348/E5.091 |
| 2008/0303931 A1 * | 12/2008 | Taguchi ................. H04N 25/78 348/340 |
| 2010/0118171 A1 | 5/2010 | Sugiyama et al. |
| 2012/0105665 A1 | 5/2012 | Matsumoto et al. |
| 2015/0342443 A1 | 12/2015 | Tanabe et al. |
| 2021/0067723 A1 * | 3/2021 | Kim ....................... H04N 25/75 |
| 2022/0128669 A1 * | 4/2022 | Liang .................... G01S 7/4863 |
| 2023/0209217 A1 | 6/2023 | Shimada |
| 2023/0395629 A1 | 12/2023 | Matsuyama |

FOREIGN PATENT DOCUMENTS

| | | |
|---|---|---|
| JP | 2020-192328 A | 12/2020 |
| WO | 2007/101360 A1 | 9/2007 |
| WO | 2015/173987 A1 | 11/2015 |
| WO | 2019/193937 A1 | 10/2019 |
| WO | 2020/144777 A1 | 7/2020 |

OTHER PUBLICATIONS

M. Waeny et al., "Ultra small digital image sensor for endoscopic applications", 2009 International Image Sensor Workshop Newsletter, (Norway), Mar. 26, 2009.

* cited by examiner

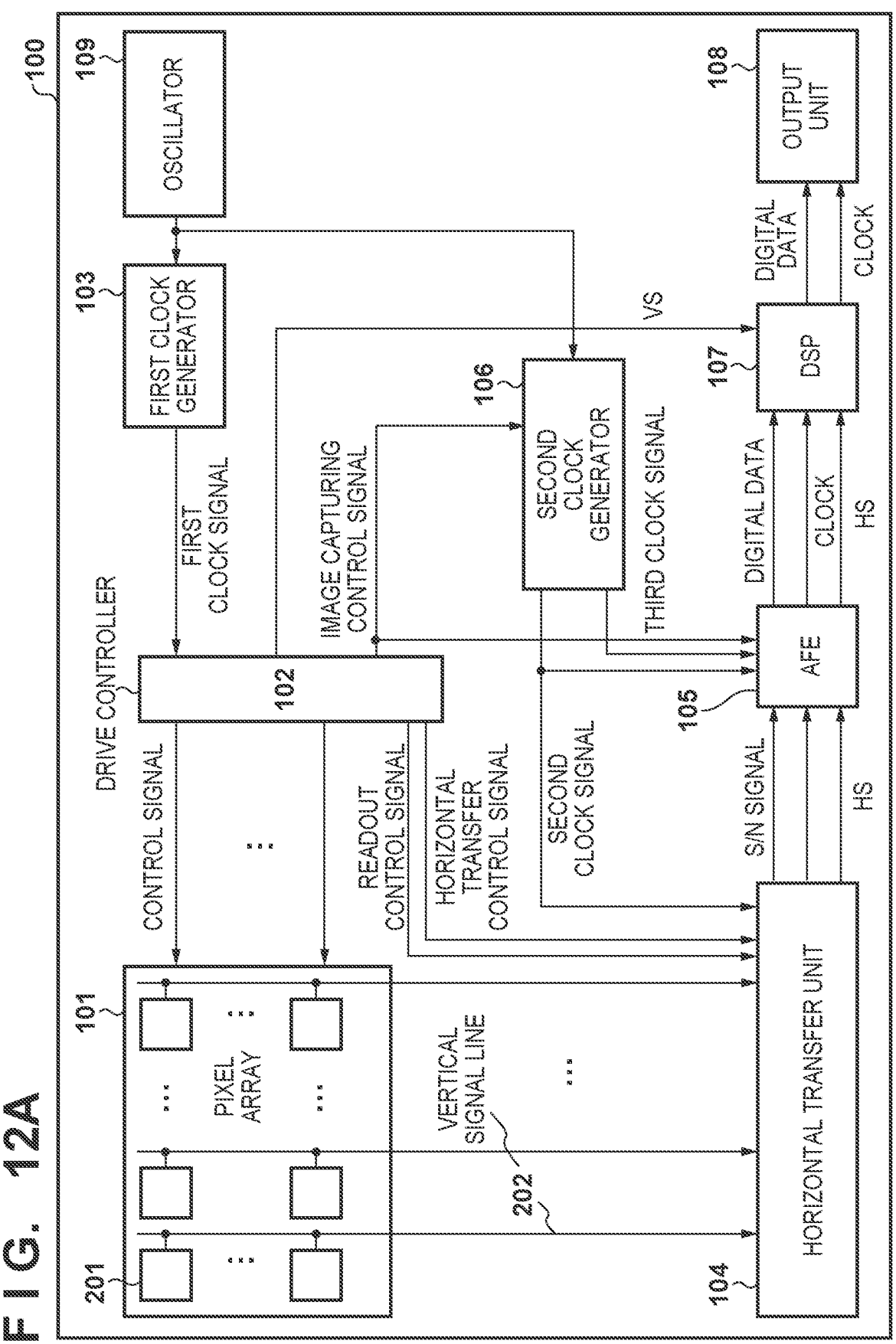

PHOTOELECTRIC CONVERSION DEVICE, CAMERA MODULE, ENDOSCOPE, ENDOSCOPE SYSTEM, AND APPARATUS

CROSS-REFERENCE TO RELATED APPLICATIONS

This application is a Continuation of International Patent Application No. PCT/JP2022/019793, filed May 10, 2022, which claims the benefit of Japanese Patent Application No. 2021-103548, filed Jun. 22, 2021, both of which are hereby incorporated by reference herein in their entirety.

BACKGROUND OF THE INVENTION

Field of the Invention

The present invention relates to a photoelectric conversion device, a camera module, an endoscope, an endoscope system, and an apparatus.

Background Art

In recent years, ultra small photoelectric conversion devices have been developed for applications such as an endoscope. In an endoscope system described in PTL 1, an analog image signal is output via a signal cable, and AD conversion is performed outside the photoelectric conversion device, thereby decreasing the circuit scale of the photoelectric conversion device. With the configuration described in PTL 1, since the analog signal is output using a long transmission path, the output image is easily affected by noise. On the other hand, NPL 1 describes an ultra small digital image sensor that includes a successive-approximation type AD converter in the photoelectric conversion device and outputs a digital signal.

CITATION LIST

Patent Literature

PTL 1: Japanese Patent Laid-Open No. 2020-192328

Non-Patent Literature

NPL 1: M. Waeny et al., "Ultra small digital image sensor for endoscopic applications", 2009 International Image Sensor Workshop Newsletter, (Norway), Mar. 26, 2009

In the configuration described in NTPL 1, by using a clock output from a ring oscillator, a readout controller controls an image capturing operation and a horizontal transfer operation, and an AD conversion controller controls the AD converter. Since the AD conversion needs to operate in synchronization with the horizontal transfer operation, in order to maintain the synchronization relationship between control of the readout controller and control of the AD conversion controller, the number of clock buffers for timing control arranged in the circuit is increased, and the circuit scale can become large. An increase in the number of clock buffers also leads to an increase in power consumption.

The present invention has as its object to provide a technique advantageous in suppressing an increase in circuit scale and an increase in power consumption due to clock control, and miniaturizing a photoelectric conversion device.

SUMMARY OF THE INVENTION

According to some embodiments, a photoelectric conversion device comprising: a pixel array in which a plurality of pixels are arranged so as to form a plurality of rows and a plurality of columns; a drive controller configured to drive the pixel array; a horizontal transfer unit configured to sequentially output analog signals respectively output from the plurality of columns of the pixel array; an AD converter configured to convert an analog signal output from the horizontal transfer unit into a digital signal; a first clock generator configured to generate a clock signal used to control an operation of the drive controller; and a second clock generator configured to generate a clock signal used to control the horizontal transfer unit and the AD converter, wherein a clock tree in which a clock signal is distributed from the first clock generator and a clock tree in which a clock signal is distributed from the second clock generator form clock trees different from each other, is provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 12A is a view showing a modification of the photoelectric conversion device shown in FIG. 1.

DESCRIPTION OF THE EMBODIMENTS

Figure 1:
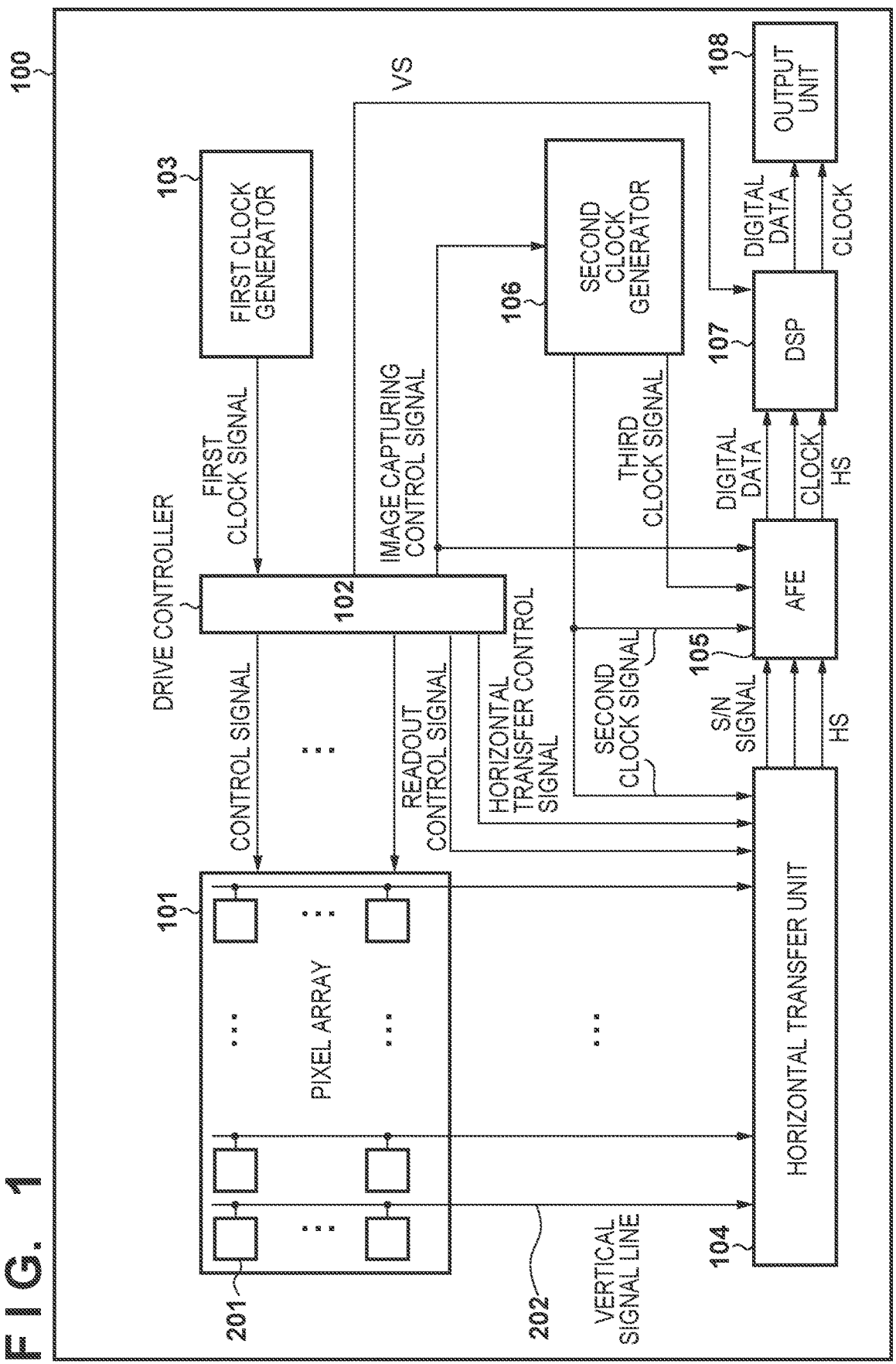
FIG. 1 is a view showing an example of the arrangement of a photoelectric conversion device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to FIGS. 1 to 14, a photoelectric conversion device according to an embodiment of the present disclosure will be described. FIG. 1 is a block diagram showing the schematic arrangement of a photoelectric conversion device 100 according to this embodiment. As shown in FIG. 1, the photoelectric conversion device 100 includes a pixel array 101, a drive controller 102, a horizontal transfer unit 104, an analog front end (AFE) 105, a digital signal processor (DSP) 107, and an output unit 108.

In the pixel array 101, a plurality of pixels 201 are arranged so as to form a plurality of rows and a plurality of columns. The drive controller 102 drives the pixel array 101. The horizontal transfer unit 104 sequentially outputs, to the AFE 105, analog signals respectively output from the plurality of columns of the pixel array 101 to vertical signal lines 202. The AFE 105 includes an analog amplifier and an AD converter, and converts the analog signal output from the horizontal transfer unit into a digital signal. The DSP 107 performs digital signal processing on the digital signal output from the AFE 105. The output unit 108 is an interface for outputting the digital data output from the DSP 107 to the outside of the photoelectric conversion device 100.

The photoelectric conversion device 100 further includes a first clock generator 103 that generates a clock signal used to control the operation of the drive controller 102, and a second clock generator 106 that generates a clock signal used to control the horizontal transfer unit 104 and the AFE 105. The first clock generator 103 controls the drive controller 102 using the first clock signal. The second clock generator 106 controls the horizontal transfer unit 104 and the AFE 105 using the second clock signal and the third clock signal. The first clock generator 103, the second clock generator 106, and the respective clock signals will be described later.

Figure 2:
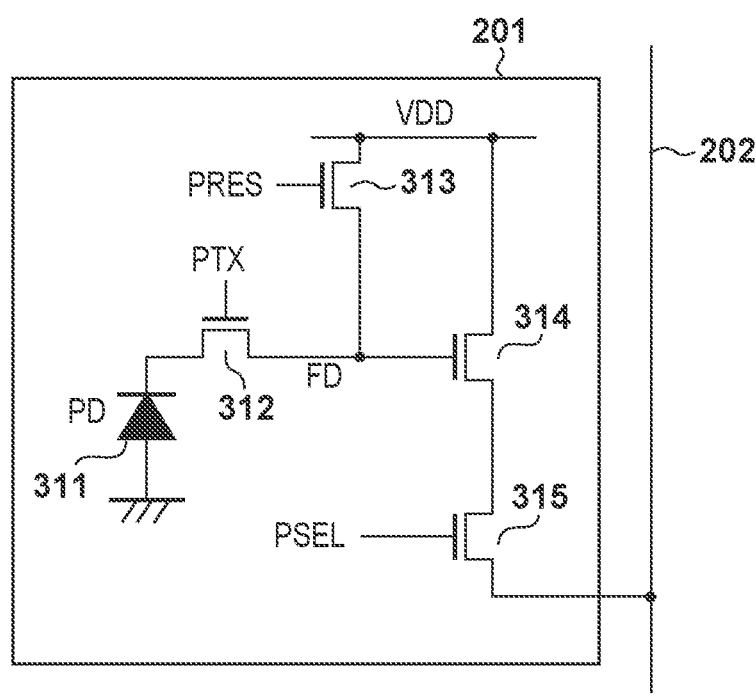
FIG. 2 is a view showing an example of the arrangement of a pixel of the photoelectric conversion device shown in FIG. 1.

FIG. 2 shows an example of the arrangement of the pixel 201 arranged in the pixel array 101. The output node of the pixel 201 is connected to the vertical signal line 202. The vertical signal line 202 is connected to a constant current source (not shown) and the horizontal transfer unit 104.

The pixel 201 includes a photoelectric conversion element 311, a charge transfer switch 312, a floating diffusion FD, a reset switch 313, a signal amplification switch 314, and a row selection switch 315. The photoelectric conversion element 311 can be, for example, an element such as a photodiode PD that generates charges corresponding to the amount of light entering the photoelectric conversion element 311.

The charge transfer switch 312 is arranged between the photoelectric conversion element 311 and the floating diffusion FD. The charge transfer switch 312 can be a transfer transistor for reading out charges accumulated in the photoelectric conversion element 311. The charge transfer switch 312 is controlled between the conductive (ON) state and the nonconductive (OFF) state by a control signal PTX.

The reset switch 313 is arranged between a power supply voltage VDD and the floating diffusion FD. The reset switch 313 can be a reset transistor for supplying the power supply voltage VDD to the floating diffusion FD to reset the circuit.

The reset switch 313 is controlled between the conductive (ON) state and the nonconductive (OFF) state by a control signal PRES.

The signal amplification switch 314 can be a source follower transistor that converts charges accumulated in the floating diffusion FD into a voltage and amplifies it, and outputs it as a voltage signal to the vertical signal line 202. The control terminal of the signal amplification switch 314 is connected to the floating diffusion FD. Two main terminals of the signal amplification switch 314 are connected to the power supply voltage VDD and the row selection switch 315, respectively.

The row selection switch 315 is arranged between the output of the signal amplification switch 314 and the vertical signal line 202. The row selection switch 315 can be a transistor for selecting a row to output the pixel signal. The row selection switch 315 is controlled between the conductive (ON) state and the nonconductive (OFF) state by a control signal PSEL.

In each pixel 201, for example, a noise signal (N signal) is read out, and then a signal signal (S signal) is read out. The changes of the floating diffusion FD after releasing the reset of the floating diffusion FD are read out as the N signal via the signal amplification switch 314. Then, the charges of the photoelectric conversion element 311 are transferred to the floating diffusion FD via the charge transfer switch 312, and the charges transferred from the photoelectric conversion element 311 to the floating diffusion are read out as the S signal via the signal amplification switch 314. The AFE 105 performs correlated double sampling processing on the S signal and the N signal output from the pixel 201 to remove the reset noise of the floating diffusion FD.

The drive controller 102 controls the photoelectric conversion device 100 under the control of an external control device (not shown). The drive controller 102 controls an internal state machine in accordance with serial communication with the external control device, and transitions from a stop state to an image capturing state. In the image capturing state, the drive controller 102 generates the control signals PTX, PRES, and PSEL for the pixel array 101 in accordance with, for example, values of a horizontal counter and a vertical counter arranged in the drive controller 102, thereby controlling the exposure control and the readout operation of the pixel 201. The control signals PTX, PRES, and PSEL are generated for each row of the pixel array 101. A slit rolling operation may be performed by controlling reset row scanning and readout row scanning for the pixel 201 in parallel.

The drive controller 102 also generates a horizontal transfer control signal and a readout control signal for the horizontal transfer unit 104, and an image capturing control signal for the AFE 105 and the second clock generator 106 in accordance with the horizontal counter, the vertical counter, and the state machine. The horizontal transfer control signal is asserted when image capturing is completed and readout is ready in the top row of the pixel array 101, and deasserted when the readout operation is completed in the last row. It can be said that the horizontal transfer control signal is a signal indicating a period for outputting the analog signal from each pixel 201 in the pixel array 101. The readout control signal is a signal for controlling output of the N signal and the S signal from the pixel 201 via the vertical signal line 202. The image capturing control signal is a signal indicating an image capturing period for performing image capturing in the pixel array 101. The image capturing control signal is asserted when the state machine of the drive controller 102 is in the image capturing state. The image capturing control signal is a signal for controlling the operations of the AFE 105 and the second clock generator 106.

The horizontal counter and the vertical counter of the drive controller 102 may be controlled by, for example, an external synchronization method according to a synchronization signal externally input to the photoelectric conversion device 100, or an internal synchronization method according to synchronization signals internally generated by the horizontal counter and the vertical counter. When considering microminiaturization of the photoelectric conversion device 100 for applications such as an endoscope, the internal synchronization method can reduce the number of input terminals. In this embodiment, the pixels are driven by a slit rolling operation. However, if the pixel structure supports a global shutter, shutter scanning may be performed simultaneously for all pixels.

The horizontal transfer unit 104 has a function of outputting, to the AFE 105, the analog signal of the pixel 201 output from the pixel array 101 in accordance with the horizontal transfer control signal transferred from the drive controller 102 and in synchronization with the second clock signal supplied from the second clock generator 106. The horizontal transfer unit 104 also has a function of generating a horizontal synchronization signal indicating one horizontal period and outputting it to the AFE 105.

Figure 3:
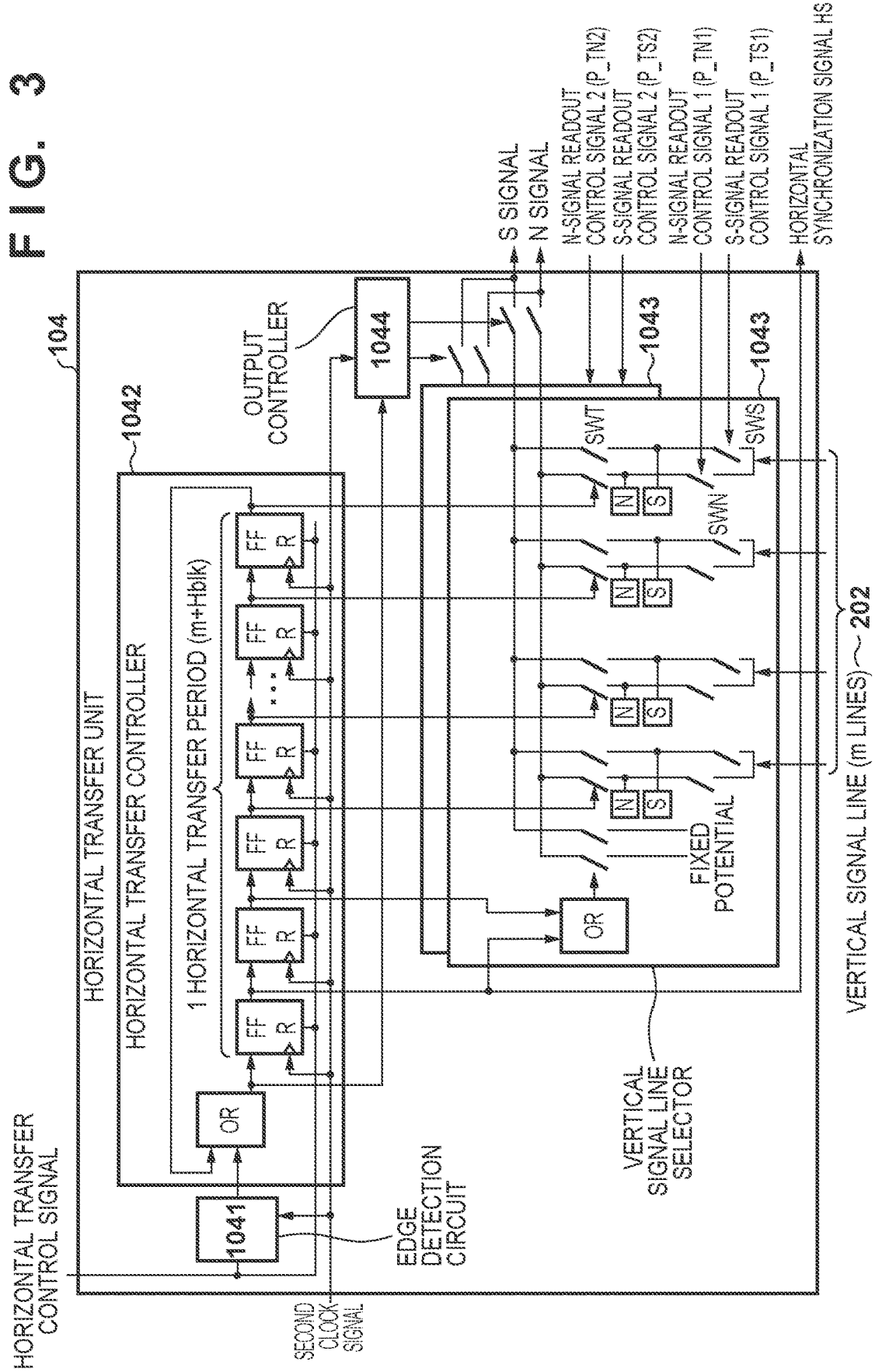
FIG. 3 is a view showing an example of the arrangement of a horizontal transfer unit of the photoelectric conversion device shown in FIG. 1.

FIG. 3 is a block diagram showing an example of the arrangement of the horizontal transfer unit 104. The horizontal transfer unit 104 includes an edge detection circuit 1041, a horizontal transfer controller 1042, two sets of vertical signal line selectors 1043, and an output controller 1044.

The edge detection circuit 1041 detects the edge of the horizontal transfer control signal which is output to the horizontal transfer unit 104 when the drive controller 102 causes each pixel 201 in the pixel array 101 to output the analog signal. When the edge of the horizontal transfer control signal is detected, the edge detection circuit 1041 outputs a pulse of one clock width to the horizontal transfer controller 1042.

The horizontal transfer controller 1042 includes a shift register that transfers a pulse for each clock. The shift register can have a ring type circuit arrangement in which a plurality of registers FF are connected in series, and the output of the last-stage register of the plurality of registers FF is connected to the input of the first-stage register of the plurality of registers FF. The OR signal of the output pulse of the edge detection circuit 1041 and the signal of the last-stage register of the shift register is input to the first-stage register of the shift register.

Figure 4:
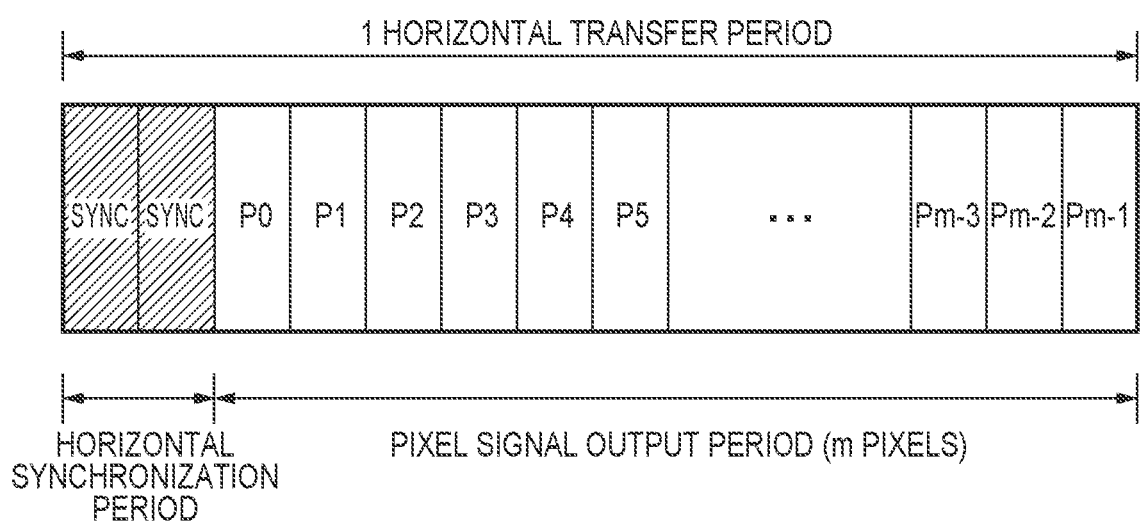
FIG. 4 is a view showing an example of output data in one horizontal transfer period of the photoelectric conversion device shown in FIG. 1.

The shift register of the horizontal transfer controller 1042 is configured such that a pulse makes one cycle from the first-stage register to the last-stage register in one horizontal transfer period for transferring signals corresponding to one row of the pixel array 101. For example, consider a case in which, as shown in FIG. 4, in one horizontal transfer period, a horizontal synchronization period Hblk including two periods and including a period for outputting a horizontal synchronization signal, a horizontal blanking period, and the like is included, the signal is output from one pixel 201 in one period, and signals are output from m pixels 201. The horizontal synchronization period Hblk is a period in which no signal is output from the pixel 201. In this case, the shift register of the horizontal transfer controller 1042 can be formed by a shift register that makes one cycle with m periods+the horizontal synchronization period Hblk (including two periods in this embodiment). That is, it can be said that the number of the plurality of registers FF included in the shift register of the horizontal transfer controller 1042 is defined by the number of the pixels 201, among the plurality of pixels 201, for which the signals are transferred in one horizontal transfer period, and the horizontal synchronization period. The horizontal transfer controller 1042 is connected to switches SWT of the vertical signal line selector 1043 to control the readout operation of the vertical signal line selector 1043 in accordance with the pulse position of the shift register.

The vertical signal line selector 1043 has a memory function of holding the S signal and the N signal of the pixel 201 input via the vertical signal line 202. For example, the wiring capacitance between the switch SWT and a switch SWS and the wiring capacitance between the switch SWT and a switch SWN can function as memories. The vertical signal line selector 1043 has a function of outputting the S signal and the N signal of each column of the pixel array 101 to the AFE 105 in one horizontal transfer period in accordance with the control signal input from the horizontal transfer controller 1042.

Figure 5:
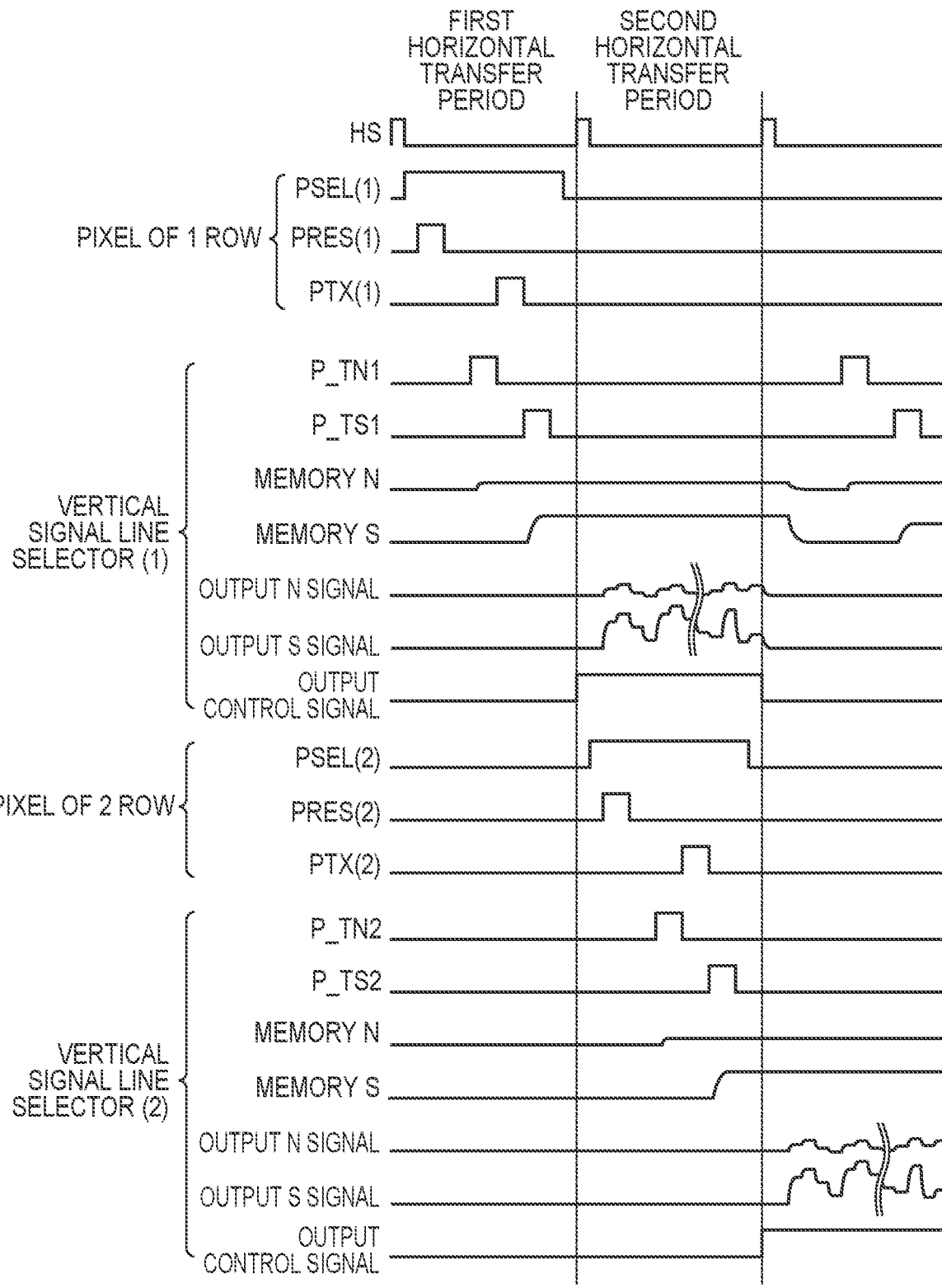
FIG. 5 is a timing chart in horizontal transfer of the photoelectric conversion device shown in FIG. 1.

The vertical signal line selector 1043 transfers, to the AFE 105, the analog signals output from the pixels 201 arranged in one row of the pixel array 101 by using, for example, two horizontal transfer periods. FIG. 5 shows a timing chart in horizontal transfer. First, in the first horizontal transfer period, in accordance with an N-signal readout control signal P_TN1 and an S-signal readout control signal P_TS1 input from the drive controller 102, the N signals and the S signals of the first row are sequentially output from the pixels 201 to the vertical signal lines 202. The vertical signal line selector 1043 holds the N signals and the S signals. Here, the N signals and the S signals are held in a memory N and a memory S, respectively, of the vertical signal line selector 1043. Then, in the second horizontal transfer period, the held N signals and S signals are sequentially output to the AFE 105 in accordance with a control signal output from the shift register of the horizontal transfer controller 1042. Since the pulse makes one cycle in one horizontal transfer period in the shift register of the horizontal transfer controller 1042, the signals output from the pixels 201 of one row are output to the AFE 105 in one horizontal transfer period. In the horizontal synchronization period Hblk in which no pixel signal is output in the horizontal transfer period, the vertical signal line selector 1043 selects not the vertical signal line 202 but a predetermined fixed potential, and the fixed potential is output to the AFE 105. Further, the output of the first-stage register of the horizontal transfer controller 1042 is output to the AFE 105 as a horizontal synchronization signal HS.

In this manner, output of the signals of the pixel 201 of one row arranged in the pixel array 101 and horizontal transfer thereof to the AFE 105 are performed using two horizontal transfer periods. In order to transfer the analog signals output from the pixels 201 to the AFE 105 in each horizontal transfer period, the horizontal transfer unit 104 can include at least two sets of vertical signal line selectors 1043. The two sets of vertical signal line selectors 1043 are controlled by the output controller 1044 so as to alternately execute one of readout of the signals from the pixels 201 and horizontal transfer thereof for each horizontal transfer period. FIG. 5 shows the horizontal transfer operation for the first row and the horizontal transfer operation for the second row.

The horizontal transfer unit 104 repeats the above-described operation until readout scanning for the entire region of the pixel array 101 is completed and the horizontal transfer control signal input from the drive controller 102 is deasserted. With this, the image signals for one frame are transferred from the pixel array 101 to the AFE 105. The horizontal transfer unit 104 can be reset until the horizontal transfer control signal is asserted and transfer of the next frame is started.

Figure 6:
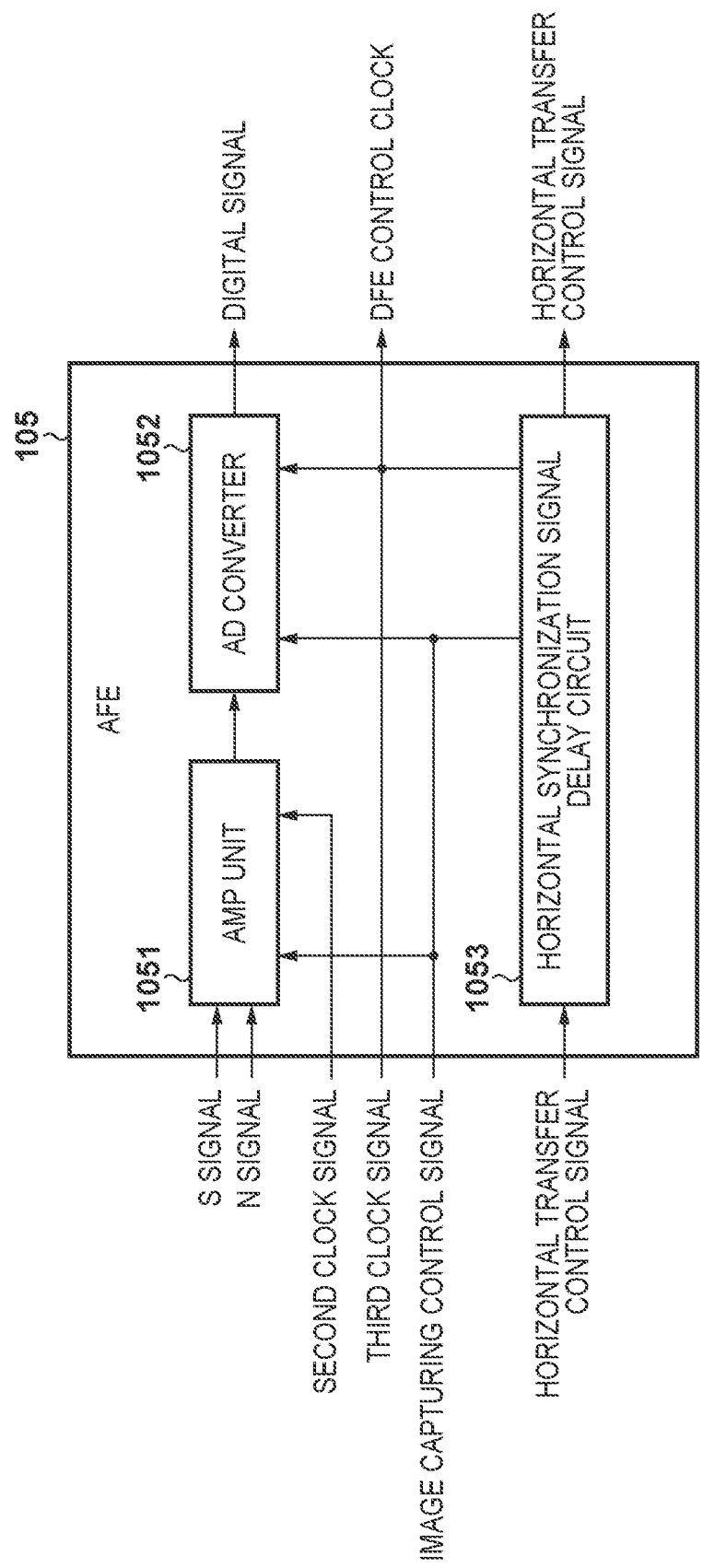
FIG. 6 is a view showing an example of the arrangement of an AFE of the photoelectric conversion device shown in FIG. 1.

The AFE 105 performs, on the S signal and N signal of the analog signal output from the horizontal transfer unit 104, gain adjustment processing, correlated double sampling processing, and AD conversion processing of converting the analog signal into a digital signal. FIG. 6 shows an example of the arrangement of the AFE 105 in this embodiment. The AFE 105 includes an AMP unit 1051, an AD converter 1052, and a horizontal synchronization signal delay circuit 1053.

The AMP unit 1051 performs correlated double sampling processing and gain adjustment processing on the S signal and the N signal transferred from the horizontal transfer unit 104. The gain adjustment processing may be performed using a programmable gain amplifier (PGA) that can be adjusted for each setting value from a register (not shown). When the image capturing control signal, which indicates the image capturing period for performing image capturing in the pixel array 101, transferred from the drive controller 102 is received, the AMP unit 1051 outputs, to the AD converter 1052, the processing result of the analog signal input from the horizontal transfer unit 104 in synchronization with the second clock signal supplied from the second clock generator 106.

Figure 7:
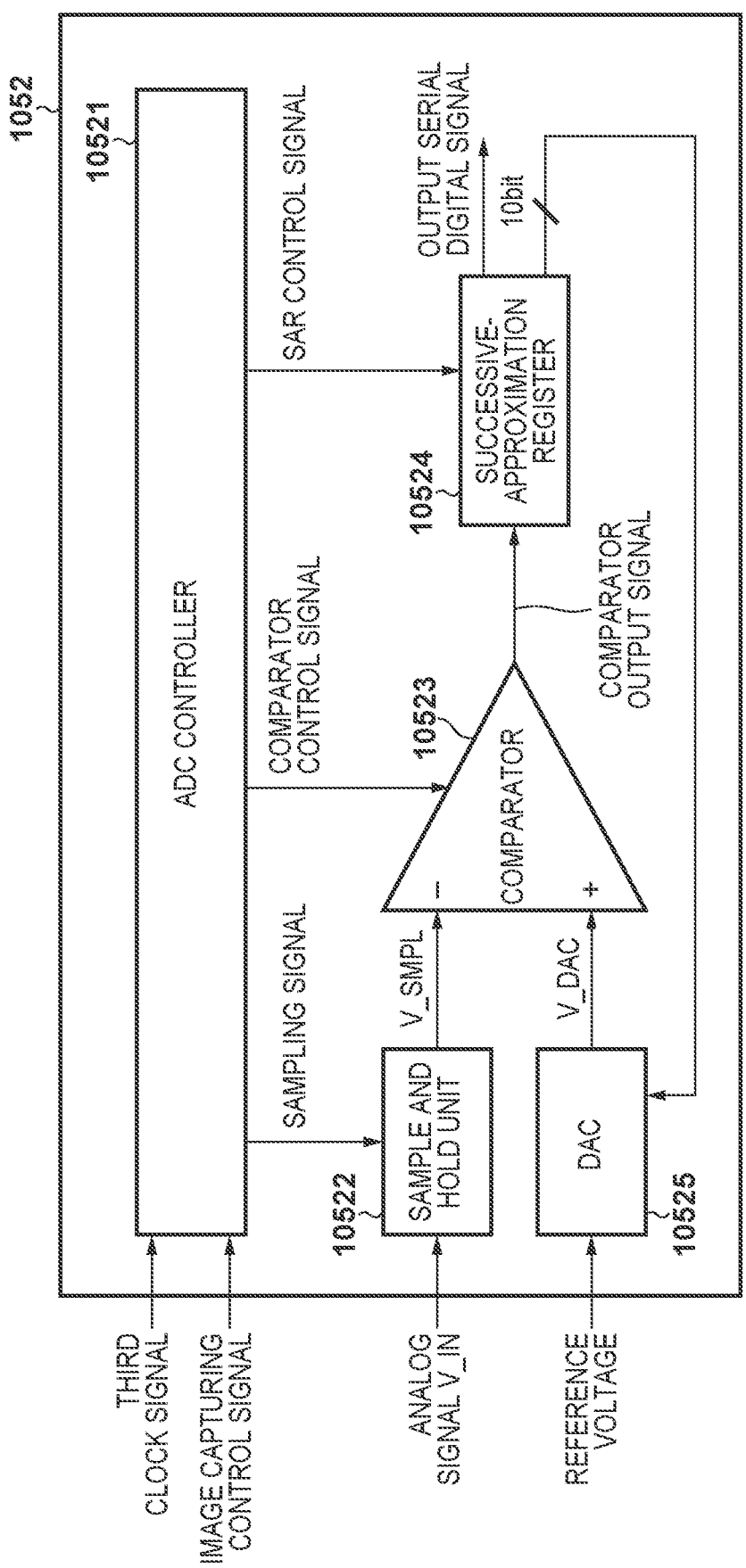
FIG. 7 is a view showing an example of the arrangement of an AD converter of the photoelectric conversion device shown in FIG. 1.

The AD converter 1052 performs AD conversion of converting the analog signal transferred from the AMP unit 1051 into a digital signal. In this embodiment, assuming that the AD converter 1052 is a successive-approximation type AD converter, an arrangement example and an operation example will be described. As shown in FIG. 7, the AD converter 1052 includes an AD conversion controller 10521, a sample hold unit 10522, a successive-approximation register 10524, a DAC 10525, and a comparator 10523. The AD conversion controller 10521 controls the AD conversion operation in the AD converter 1052. The sample hold unit 10522 holds the voltage of the analog signal transferred from the AMP unit 1051. The DAC 10525 performs DA conversion based on the output value of the successive-approximation register 10524 and a reference voltage. The comparator 10523 compares the output voltage of the DAC 10525 with the voltage of the sample hold unit 10522.

Figure 8:
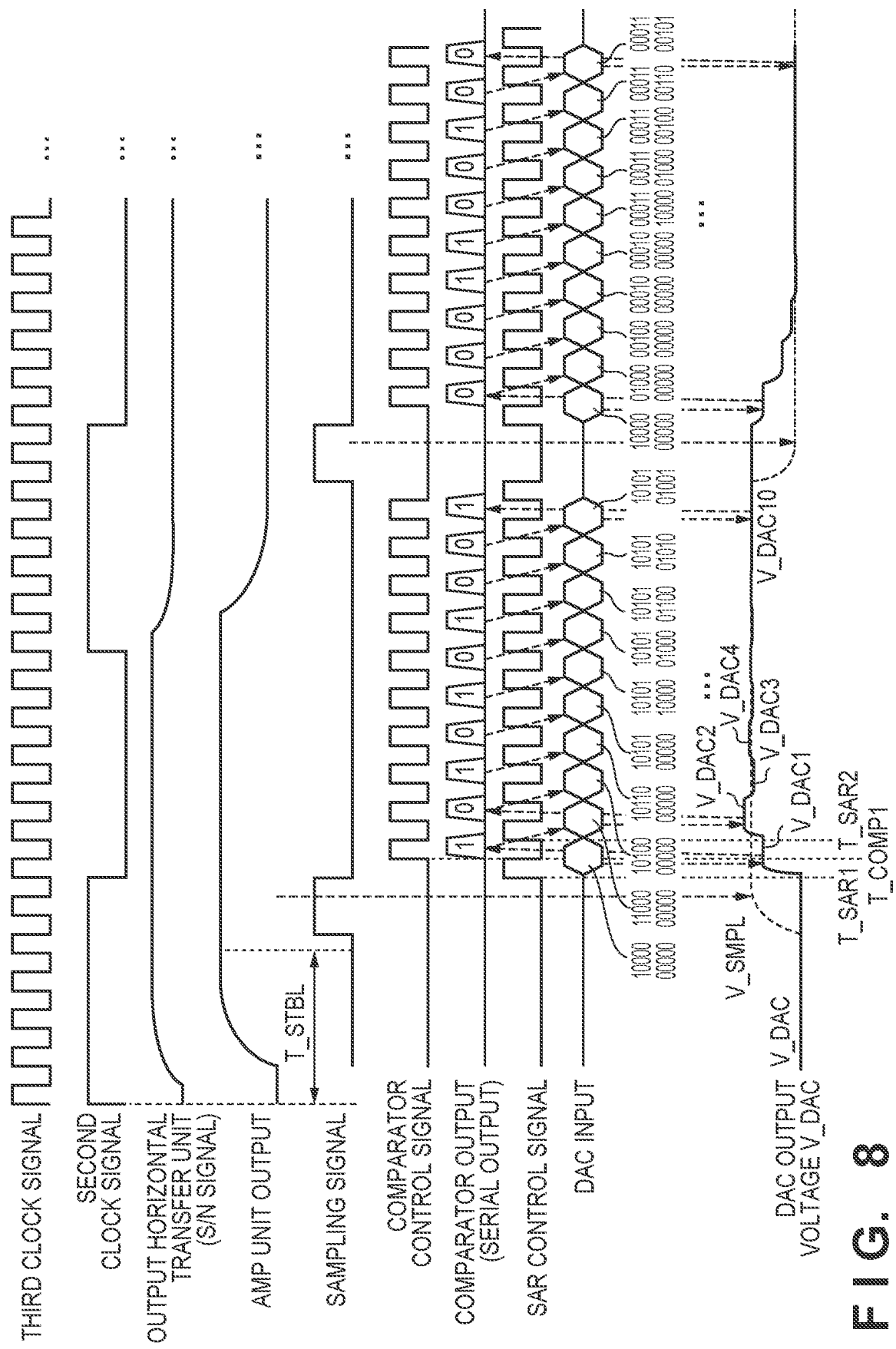
FIG. 8 is a timing chart in the AFE of the photoelectric conversion device shown in FIG. 1.

FIG. 8 is a timing chart showing an example of the operation of the AD converter 1052. Based on the image capturing control signal transferred from the drive controller 102, the AD converter 1052 starts an operation of converting the analog signal into a digital signal. More specifically, when the image capturing control signal is received, the AD conversion controller 10521 generates control signals for the sample hold unit 10522, the comparator 10523, and the successive-approximation register 10524 in synchronization with the third clock signal supplied from the second clock generator 106. With this, AD conversion processing is started. The operation of AD-converting the analog signal output from one pixel 201 will be described below.

In accordance with a sampling signal from the AD conversion controller 10521, the sample hold unit 10522 receives the voltage during the stable period of an analog signal V_IN input from the AMP unit 1051. As has been described above, the horizontal transfer unit 104 (and the AMP unit 1051) outputs the analog signal in synchronization with the second clock signal supplied from the second clock generator 106. Here, the time from the edge of the clock signal which has triggered output of the analog signal in the horizontal transfer unit 104 to stabilization of the analog signal V_IN output after the AMP unit 1051 has processed the analog signal is indicated by a time T_STBL. In this case, the sample hold unit 10522 needs to receive the analog signal V_IN after a period equal to or longer than the time T_STBL has elapsed from the rise of the second clock signal. That is, the AD converter 1052 needs to sample an analog signal, which has been output from the horizontal transfer unit 104 in synchronization with the second clock signal supplied from the second clock generator 106, after a predetermine time has elapsed from the edge of the clock signal which has triggered output of the analog signal. Therefore, the AD conversion controller 10521 asserts the sampling signal at a timing after the time T_STBL or more has elapsed from the rise of the second clock. For example, the above-described external control device may be able to set the assert timing of the sampling signal. After sampling of the analog signal V_IN is complete, the sample hold unit 10522 outputs a voltage V_SMPL to the comparator 10523.

The successive-approximation register 10524 has a function of controlling the voltage output from the DAC 10525 to the comparator 10523 and a function of outputting the AD conversion result in accordance with an SAR control signal supplied from the AD conversion controller 10521. The successive-approximation register 10524 can have the number of control bits equal to or larger than that corresponding to the output accuracy of the AD converter 1052. Here, a description will be given assuming that the number of output bits of the AD converter 1052 is 10 bits, and the number of bits of the successive-approximation register 10524 is also 10 bits.

At time T_SAR1, as the initial value of AD conversion of the analog signal output from each pixel 201, the successive-approximation register 10524 outputs a value with 1 in the MSB and 0 in the remaining bits, that is, the intermediate value of the maximum output value to the DAC 10525. In accordance with the output value of the successive-approximation register 10524, the DAC 10525 outputs a voltage V_DAC1 of the intermediate value to the comparator 10523. At time T_COMP1, in accordance with a comparator control signal output by the AD conversion controller 10521, the comparator 10523 compares the voltage V_SMPL output by the sample hold unit 10522 with the voltage V_DAC1 output by the DAC 10525. As a result of the comparison, if the voltage V_SMPL is higher than the voltage V_DAC1, the comparator 10523 outputs 1, and the successive-approximation register 10524 decides the MSB as 1. If the voltage V_SMPL is lower than the voltage V_DAC1, the comparator 10523 outputs 0, and the successive-approximation register 10524 decides the MSB to be 0.

At time T_SAR2 in the next cycle, the successive-approximation register 10524 makes a value with the above-described decided value in the MSB, 1 in the bit after the MSB, and 0 in the remaining bits, thereby causing the DAC 10525 to generate a voltage V_DAC2. The comparator 10523 compares the sampling voltage V_SMPL with the voltage V_DAC2.

By repeating the above-described operation up to the bit accuracy (LSB) of AD conversion, the value of each bit is decided, and AD conversion is completed. The digital signal (digital data) output from the AD converter 1052 may be serial data in synchronization with the third clock signal, or may be parallel data in synchronization with the second clock signal. Here, a description will be given assuming that the digital signal output from the AD converter 1052 is serial data in synchronization with the third clock signal. In this case, the comparison result output by the comparator 10523 is output from the successive-approximation register 10524. Further, a clock signal (the third clock signal in this embodiment) in synchronization with the output digital signal is output from the AFE 105 to the DSP 107. Furthermore, the horizontal synchronization signal delay circuit 1053 of the AFE 105 delays the horizontal synchronization signal transferred from the horizontal transfer unit 104 by the internal delay of the AFE 105, and supplies it to the DSP 107.

In this embodiment, an example has been described in which AD conversion is performed in one AD converter 1052. However, the present invention is not limited to this. In order to increase the accuracy of AD conversion, for example, AD conversion may be divided for upper bits and lower bits, and an amplifier that increases the gain of the input voltage during AD conversion of the lower bits may be provided to increase the AD conversion accuracy for the lower bits. Various AD conversion methods can be used, such as flash AD conversion in which a plurality of reference voltages are set and comparisons of the output signal of the AMP unit 1051 are performed in parallel using parallel comparators, pipeline AD conversion, and ΔΣ AD conversion. In order to miniaturize the photoelectric conversion device 100, the method that decreases the circuit scale of the AD converter 1052 may be selected, as needed. During the period of the horizontal synchronization period Hblk in which no signal is output from the pixel 201, a digital signal corresponding to the predetermine fixed potential may be output as described above. Alternatively, for example, appropriate additional information may be output in this period.

The DSP 107 performs various kinds of digital processing such as digital gain processing and shading correction processing on the digital signal output from the AD converter 1052 of the AFE 105. The DSP 107 is supplied with the third clock signal from the second clock generator 106 via the AFE 105 including the AD converter 1052, and digital processing is performed on the digital signal in synchronization with the third clock signal. The DSP 107 outputs the processed digital signal to the output unit 108.

The output unit 108 is an interface for outputting the digital signal to the outside of the photoelectric conversion device 100. The output unit 108 can use, for example, a differential output such as LVDS. When the output unit 108 uses a clock embedded protocol that requires a small number of pins, the circuit scale of the photoelectric conversion device 100 can be suppressed. However, the present invention is not limited to this. For example, a communication standard such as MIPI or HDMI® may be used for the output unit 108. In this embodiment, the horizontal transfer period has the same cycle in every row. As shown in FIG. 4, after signals are output in the horizontal synchronization period including two periods are output, digital signals of m pixels are output.

Next, the first clock generator 103, the second clock generator 106, a clock tree in which the clock signal is distributed from the first clock generator 103, and a clock tree in which the clock signal is distributed from the second clock generator 106 will be described.

The first clock generator 103 generates the first clock signal for controlling the operation of the drive controller 102. The resolutions of the horizontal transfer control signal and the readout control signal transferred to the horizontal transfer unit 104 by the drive controller 102 are lower than the resolution of the drive pulse used by the drive controller 102 to drive the pixel array 101. Similarly, the resolution of the image capturing control signal transferred to the second clock generator 106 and the AFE 105 by the drive controller 102 is lower than the resolution of the drive pulse used by the drive controller 102 to drive the pixel array 101. Therefore, as for the operating frequency of the drive controller 102, the frequency of the first clock signal is decided by the resolution of the drive pulse for driving the pixel array 101. In this embodiment, the frequency of the first clock signal supplied to the drive controller 102 by the first clock generator 103 to cause the drive controller 102 to drive each pixel 201 arranged in the pixel array 101 is assumed to be 5 MHz.

The second clock generator 106 generates the second clock signal and the third clock signal for controlling the operations of the horizontal transfer unit 104 and the AFE 105. More specifically, as has been described above, the second clock generator 106 generates the second clock signal, and supplies it to the horizontal transfer unit 104 and the AFE 105. The second clock generator 106 also generates the third clock signal, and supplies it to the AFE 105. As shown in FIG. 8, the AD converter 1052 that operates in synchronization with the third clock signal needs to operate faster than the AMP unit 1051 that operates in synchronization with the second clock signal. That is, the frequency of the third clock signal supplied from the second clock generator 106 to the AD converter 1052 is higher than the frequency of the second clock signal supplied from the second clock generator 106 to the horizontal transfer unit 104 and the AMP unit 1051. For example, the frequency of the second clock signal may be 10 MHz, and the frequency of the third clock signal may be 120 MHz.

In this manner, the second clock generator 106 supplies clock signals of different frequencies to the horizontal transfer unit 104 and the AD converter 1052, respectively, based on a reference clock signal in the second clock generator 106. For example, the second clock generator may supply the reference clock signal of 120 MHz to the AD converter 1052 as the third clock signal, and supply a clock signal obtained by dividing the reference clock signal into 12 signals to the horizontal transfer unit 104 and the AMP unit 1051 as the second clock signal. Alternatively, for example, the reference clock signal of 10 MHz may be supplied to the horizontal transfer unit 104 and the AMP unit 1051 as the second clock signal, and a clock signal obtained by multiplying the reference clock signal by 12 may be supplied to the AD converter 1052 as the third clock. Alternatively, the reference clock signal in the second clock generator 106 may have a frequency higher than the frequencies of the second clock signal and the third clock signal, and may be divided into each desired frequency.

The reference clock signal in each of the first clock generator 103 and the second clock generator 106 may be externally input. Alternatively, for example, each of the first clock generator 103 and the second clock generator 106 may include an oscillator that generates a reference clock signal for supplying the first to third clock signals.

In this embodiment, as has been described above, the frequency of the third clock signal is higher than the frequencies of the first clock signal and the second clock signal. That is, the frequency of the third clock signal supplied to the AD converter 1052 by the second clock generator 106 is higher than the frequency of the clock signal supplied to the drive controller 102 by the first clock generator 103. Further, the frequency of the second clock signal is higher than the frequency of the first clock signal. That is, the frequency of the second clock signal supplied to the horizontal transfer unit 104 and the AMP unit 1051 by the second clock generator 106 is higher than the frequency of the clock signal supplied to the drive controller 102 by the first clock generator 103. However, the present invention is not limited to this. For example, the frequency of the first clock signal may be equal to the frequency of the second clock signal or the frequency of the third clock signal.

As has been described above, the AD converter 1052 needs to match the timing of performing sampling in the sample hold unit 10522 with respect to the analog signal output by the AMP unit 1051. Therefore, each of the AD converter 1052 and the second clock generator 106 starts the operation in accordance with the image capturing control signal transferred from the drive controller 102. Further, the AD converter 1052 and the second clock generator 106 operate such that the phase relationship among the second clock signal, the third clock signal, the sampling signal, the comparator control signal, and the SAR control signal coincides with the relationship shown in FIG. 8.

In this manner, each of the horizontal transfer unit 104 and the AFE 105 (the AMP unit 1051 and the AD converter 1052) operates without being supplied with the first clock signal directly from the first clock generator 103 or via the drive controller 102. That is, in this embodiment, a clock tree in which the clock signal is distributed from the first clock generator 103 and a clock tree in which the clock signal is distributed from the second clock generator 106 form clock trees different from each other.

Figure 9:
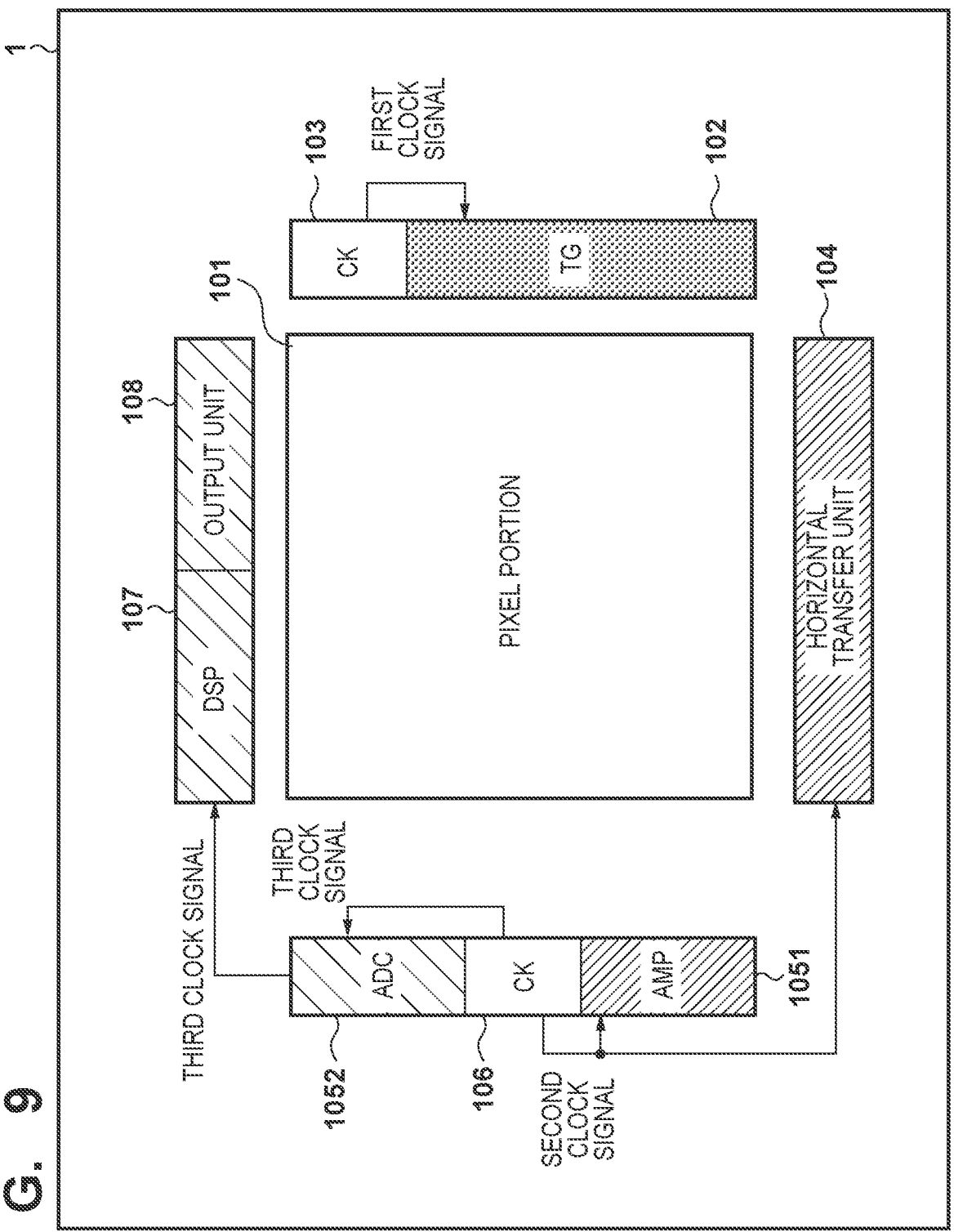
FIG. 9 is a view showing an example of the layout of the photoelectric conversion device shown in FIG. 1.

FIG. 9 shows the block layout of the photoelectric conversion device 100 and clock signals to be supplied. In this embodiment, driving of the pixel array 101 is controlled by the first clock signal supplied from the first clock generator 103, and driving of the horizontal transfer unit 104 and the AFE 105 is controlled by the second clock signal and the third clock signal supplied from the second clock generator 106. Further, the operations of the horizontal transfer unit 104 and the AFE 105 are controlled to start by the horizontal transfer control signal, the readout control signal, and the image capturing control signal transferred from the drive controller 102, each of which has a low resolution. Accordingly, it is unnecessary to arrange many clock buffers for timing control between the clock tree in which the clock signal is distributed from the first clock generator 103 and the clock tree in which the clock signals are distributed from the second clock generator 106. In addition, as shown in FIG. 9, the horizontal transfer unit 104 and the AFE 105, which operate in the clock tree in which the clock signals are supplied from the second clock generator 106, can be arranged relatively close to each other. Accordingly, the number of clock buffers can be suppressed. As a result, an increase in circuit scale and an increase in power consumption of the photoelectric conversion device 100 due to clock control can be suppressed, and miniaturization of the photoelectric conversion device 100 can be implemented.

Figure 10:
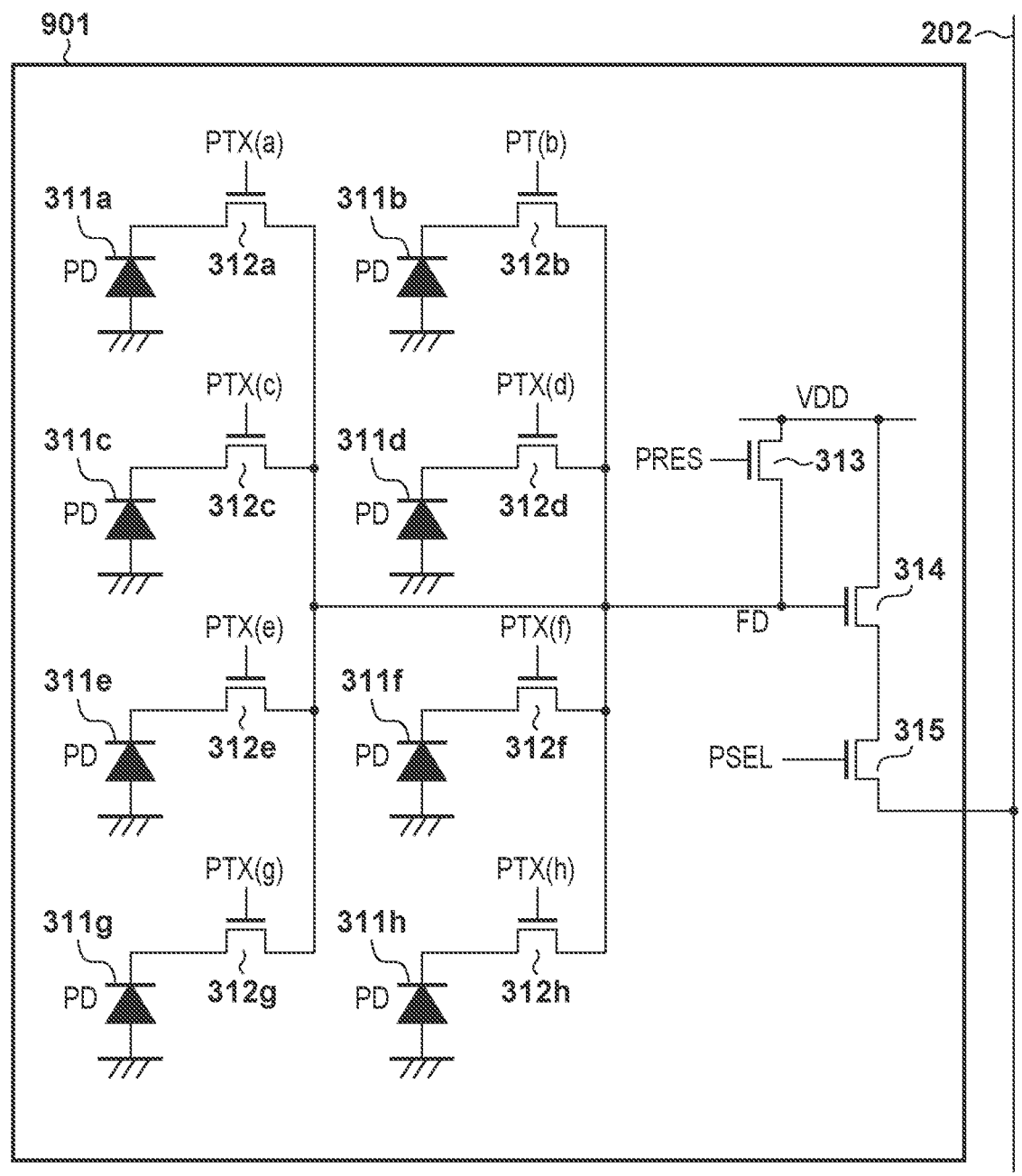
FIG. 10 is a view showing a modification of the pixel shown in FIG. 2.

Next, using FIGS. 10 and 11, a case will be described in which two or more adjacent pixels (photoelectric conversion elements 311) share the floating diffusion FD in the pixel array 101 for further miniaturization of the photoelectric conversion device 100. FIG. 10 shows an example of the arrangement of a pixel group 901 in which two or more adjacent pixels (photoelectric conversion elements 311) share the floating diffusion FD, and FIG. 11 shows an example of the arrangement of a horizontal transfer unit 1004 corresponding to the pixel array 101 including the pixel group 901.

In this embodiment, the pixel array 101 includes pixels (photoelectric conversion elements 311) arranged in a matrix of n rows×m columns. In this case, as shown in FIG. 10, the pixel group 901 is formed in which K photoelectric conversion elements 311 arranged along the vertical signal line 202 and L photoelectric conversion elements 311 arranged in the row direction share one floating diffusion FD. In other words, output nodes of K×L photoelectric conversion elements 311 are connected to one vertical signal line 202. Here, as shown in FIG. 10, a description will be given assuming that K=4, L=2, and eight photoelectric conversion elements 311a to 311h in total share one floating diffusion FD and are connected to one vertical signal line 202.

In the embodiment described above, the pixels 201 arranged in one row of the pixel array 101 can output analog signals in one horizontal transfer period. On the other hand, if the pixel array 101 has the arrangement in which two photoelectric conversion elements 311 arranged in the row direction share the floating diffusion FD as shown in FIG. 10, the signal of the pixel (photoelectric conversion element 311) arranged in the odd-numbered row and the signal of the pixel (photoelectric conversion element 311) arranged in the even-numbered row need to be output in the horizontal transfer periods different from each other.

Figure 11:
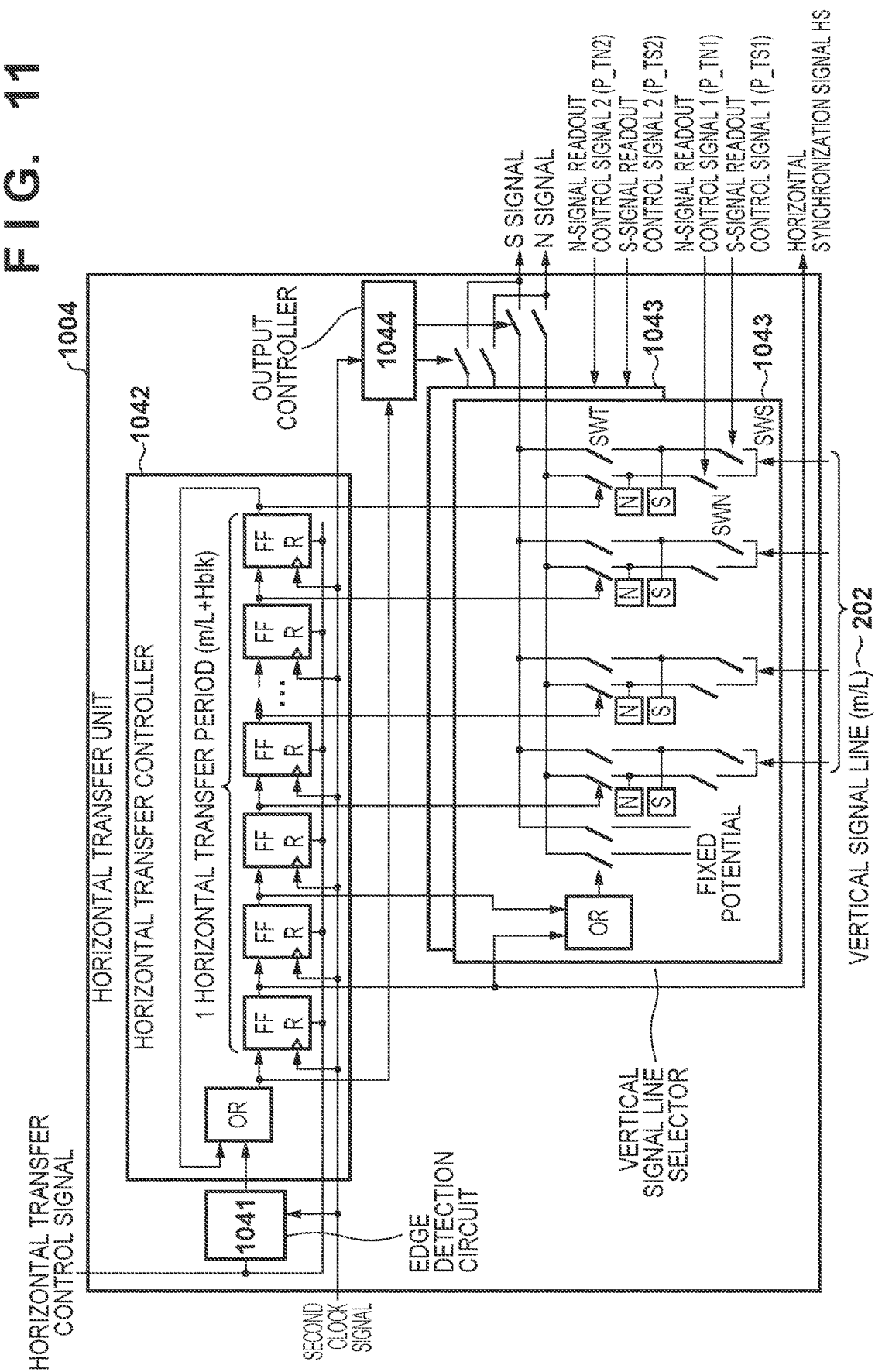
FIG. 11 is a view showing a modification of the horizontal transfer unit shown in FIG. 3.

Therefore, the horizontal transfer unit 1004 corresponding to the pixel array 101 including the pixel group 901 shown in FIG. 10 is configured to be connected to the m/L vertical signal lines 202 as shown in FIG. 11. As in the above description, one horizontal transfer period includes the horizontal synchronization period Hblk and a period for outputting signals from the pixels. Accordingly, the shift register of a horizontal transfer controller 1042 of the horizontal transfer unit 1004 is configured such that a pulse makes one cycle from the first-stage register to the last-stage register in m/L periods+the horizontal synchronization period Hblk (for example, two periods as in the above description). In this case, the number of the plurality of registers FF of the shift register can be m/L+2. In this manner, it can be said that the number of the plurality of registers FF of the shift register of the horizontal transfer controller 1042 is defined by the number of the pixels 201, among the plurality of pixels 201, from which signals are transferred in one horizontal transfer period, the horizontal synchronization period, and the number of the photoelectric conversion elements 311 arranged in the row direction among the photoelectric conversion elements 311a to 311h sharing the floating diffusion FD.

The drive controller 102 reads out a signal from one photoelectric conversion element 311 in the pixel group 901 during one horizontal transfer period. The drive controller 102 controls the pixel group 901 and the transfer control signal to the horizontal transfer unit 1004 so as to read out signals from, for example, the photoelectric conversion elements 311a, 311b, ..., 311h in this order over eight horizontal transfer periods. When outputting signals from the photoelectric conversion elements 311a, 311c, 311e, and 311g, the drive controller 102 transfers the signals to the vertical signal line selector 1043 while setting an N signal readout control signal 1 and an S signal readout control signal 1 in a connection state, and outputs the signals to the AFE 105 in the next horizontal transfer period. When outputting signals from the photoelectric conversion elements 311b, 311d, 311f, and 311h, the drive controller 102 transfers the signals to the vertical signal line selector 1043 while setting an N signal readout control signal 2 and an S signal readout control signal 2 in a connection state, and outputs the signals to the AFE 105 in the next horizontal transfer period.

In this manner, in the case in which two or more pixels (photoelectric conversion elements 311) arranged in the row direction share the floating diffusion FD, the number of stages of registers FF of the shift register is configured such that a pulse makes one cycle in m/L periods+the horizontal synchronization period Hblk. With this, the horizontal transfer unit 1004 that operates similarly to the horizontal transfer unit 104 descried above can be configured. By using the arrangement described in FIGS. 10 and 11, it is possible to decrease the circuit scale of the pixel array 101, and implement further miniaturization of the photoelectric conversion device 100.

In the arrangement shown in FIG. 1, the example has been described in which the first clock generator 103 and the second clock generator 106 separately generate the first clock signal to the third clock signal. However, generation of the clock signals is not limited to the arrangement shown in FIG. 1. The photoelectric conversion device 100 may include an oscillator 109, and each of the first clock generator 103 and the second clock generator 106 may generate a clock signal based on the output of the oscillator 109.

Figure 12B:
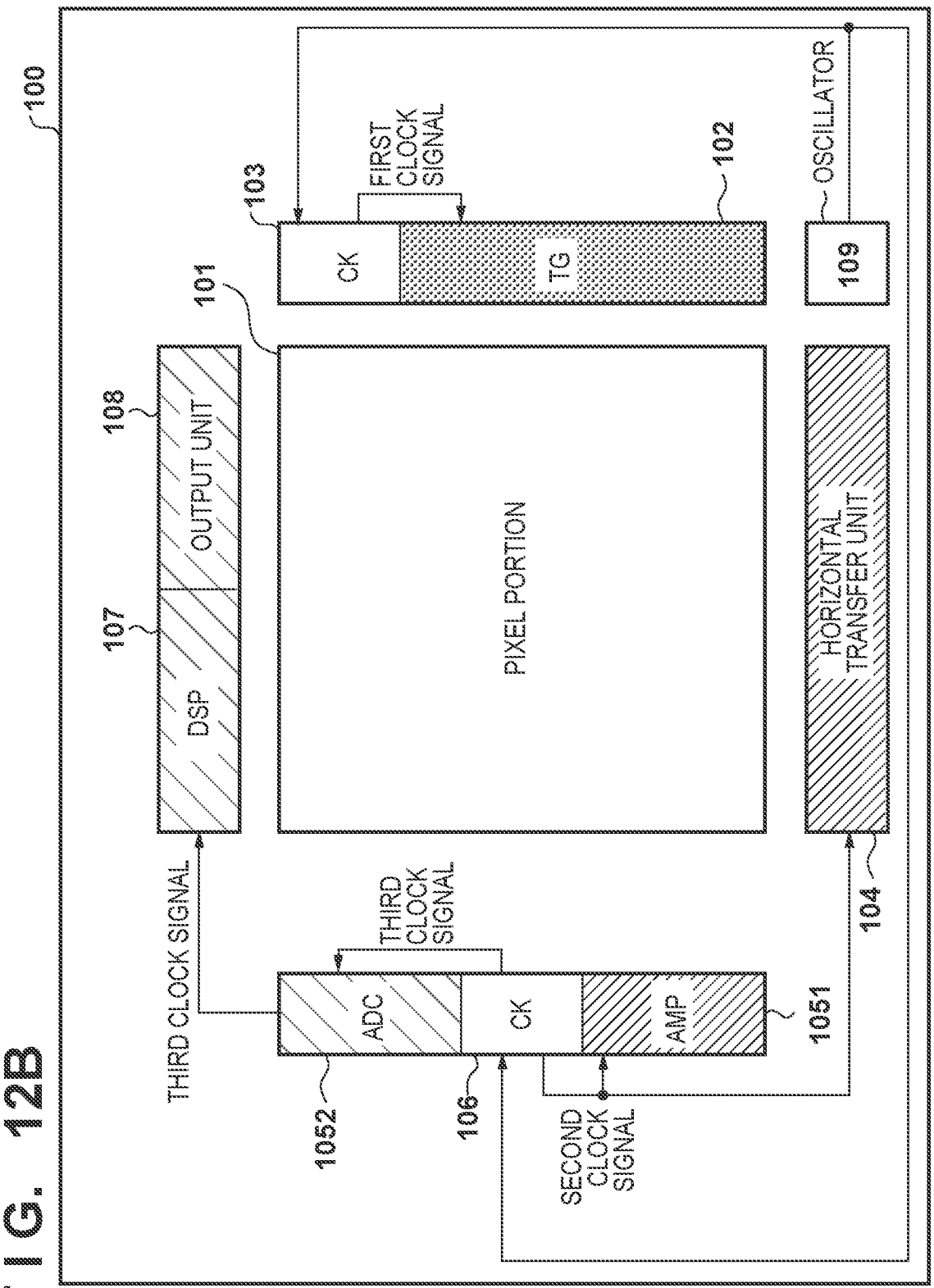
FIG. 12B is a view showing an example of the layout of the photoelectric conversion device shown in FIG. 12A.

FIG. 12A shows an example of the arrangement of the photoelectric conversion device 100 including the oscillator 109, and FIG. 12B shows the block layout of the photoelectric conversion device 100 and clock signals to be supplied. As shown in FIG. 12A, each of the first clock generator 103 and the second clock generator 106 receives a clock signal output by the oscillator 109. The first clock generator 103 generates the first clock signal, and the second clock generator 106 generates the second clock signal and the third clock signal. Since a clock tree in which the first clock signal is distributed is different from a clock tree in which the second clock signal and the third clock signal are distributed, the phase of the clock signal supplied from the oscillator 109 needs not be aligned in the first clock generator 103 and the second clock generator 106. It may be configured such that the frequency of the oscillator 109 can be adjusted by, for example, a voltage supplied from an external power supply (not shown). Alternatively, it may be configured such that the frequency of the oscillator 109 can be adjusted by communication from the above-described external control device.

Here, a description will be given assuming that the oscillator 109 generates a clock signal of 120 MHz. In this case, the first clock generator 103 may divide the clock signal of 120 MHz supplied from the oscillator 109 into 12 clock signals, and output the clock signal of 10 MHz as the first clock signal. The second clock generator 106 may divide the clock signal of 120 MHz into 12 clock signals, and output the clock signal of 10 MHz as the second clock signal. Alternatively, the second clock generator 106 may output the clock signal of 120 MHz, which is supplied from the oscillator 109, as the third clock signal of 120 MHz intact.

As shown in FIGS. 12A and 12B, in the case in which the oscillator 109 is arranged in the photoelectric conversion device 100, the first clock signal, the second clock signal, and the third clock signal for controlling the respective components in the photoelectric conversion device 100 are generated from the clock signal output from one oscillator 109. Therefore, a shift due to clock deviation is less likely to occur. Also in the arrangement shown in FIGS. 12A and 12B, it is unnecessary to arrange many clock buffers for timing control between the clock tree in which the clock signal is distributed from the first clock generator 103 and the clock tree in which the clock signals are distributed from the second clock generator 106. In addition, as shown in FIG. 12A, the horizontal transfer unit 104 and the AFE 105 that operate in the clock tree in which the clock signals are supplied from the second clock generator 106 can be arranged relatively close to each other. Accordingly, the number of clock buffers can be suppressed. As a result, an increase in circuit scale and an increase in power consumption of the photoelectric conversion device 100 due to clock control can be suppressed, and miniaturization of the photoelectric conversion device 100 can be implemented.

Figure 13:
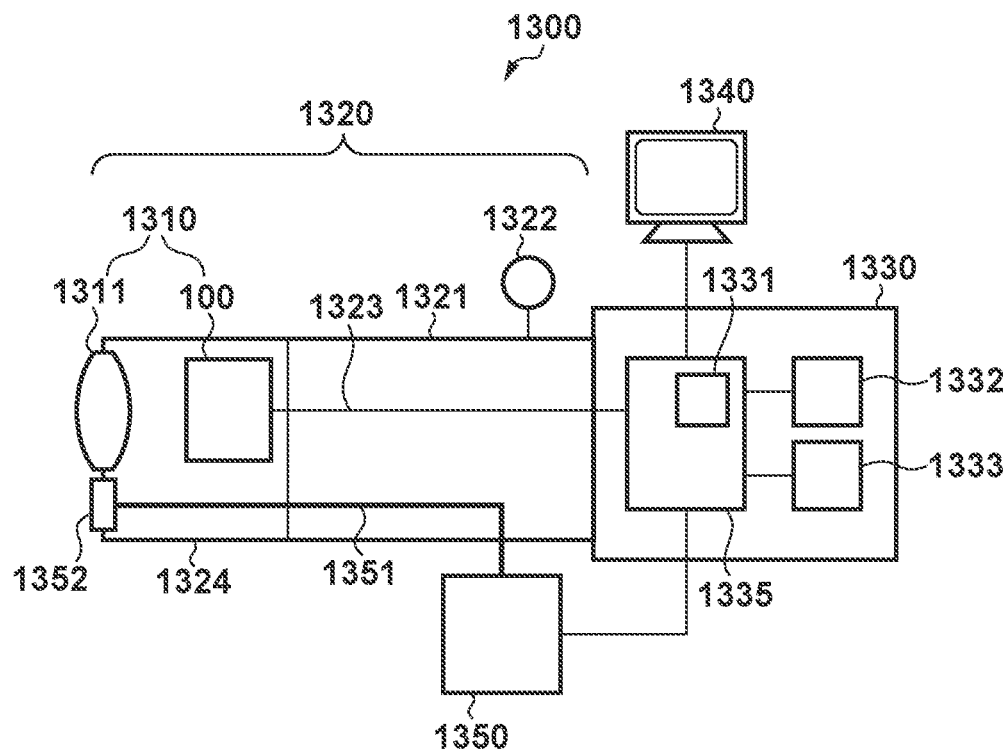
FIG. 13 is a view showing an example of the arrangement of a camera module including the photoelectric conversion device shown in FIG. 1, an endoscope using the camera module, and an endoscope system.

Next, as application examples of the photoelectric conversion device 100 described above, a camera module including the photoelectric conversion device 100, an endoscope using the camera module including the photoelectric conversion device 100, and an endoscope system will be described. FIG. 13 is a block diagram showing an example of the configuration of an endoscope system 1300 that includes an endoscope 1320 using a camera module 1310 including the photoelectric conversion device 100 described above. The endoscope system 1300 includes the endoscope 1320 that includes the camera module 1310 including the photoelectric conversion device 100, and a cable 1321 used to transfer a signal output from the camera module 1310. The endoscope system 1300 also includes a control device 1330 connected to the cable 1321 and including a signal processor 1331 that processes the signal output from the camera module 1310. The endoscope system 1300 further includes a display device 1340 for displaying an image corresponding to the signal output from the camera module 1310, and a light source device 1350 that supplies light during image capturing performed by the camera module 1310.

In the endoscope system 1300, at least a part of the endoscope 1320 including the camera module 1310 and the cable 1321 is inserted into the body cavity and used to observe an observation target. The camera module 1310 is arranged in an end portion 1324 of the endoscope 1320 to be inserted into the body cavity. The camera module 1310 includes the photoelectric conversion device 100 described above, and an optical system 1311 that allows light to enter the photoelectric conversion device 100. The optical system 1311 is formed by including one or a plurality of lenses.

An illumination optical system 1352 for irradiating the observation target with light emitted from the light source device 1350 is arranged in the end portion 1324 of the endoscope 1320 where the camera module 1310 is arranged. The illumination optical system 1352 is formed by including one or a plurality of lenses. The light emitted from the light source device 1350 is supplied to the illumination optical system 1352 via an optical path 1351 such as a flexible optical fiber, and illuminates the observation target.

The cable 1321 of the endoscope 1320 can be flexible. The cable 1321 can be deformed to an arbitrary direction and angle by a user operating an operator 1322 of the endoscope 1320. Thus, the camera module 1310 can be directed to a desired direction corresponding to the observation target. A signal transmission line 1323 is arranged in the cable 1321, and transmits a signal output from the camera module 1310 to the signal processor 1331 of the control device 1330. The optical path 1351 described above can also pass through the cable 1321.

In addition, a forceps and a wire for collecting a biotissue of the observation target, an insertion hole for inserting an injection needle or the like, and a storage hole for storing an electric scalpel for similarly collecting a biotissue, and the like can be arranged in the end portion 1324 and the cable 1321 of the endoscope 1320. A fluid passage for supplying air or water to or sucking a liquid from the observation target part can also be arranged in the end portion 1324 and the cable 1321 of the endoscope 1320.

The control device 1330 includes a controller 1335 for controlling the respective components of the endoscope system 1300. The controller 1335 can be an electric circuit including a processor (for example, a CPU, an MPU, an ASIC, or the like) that executes software (a program) to perform a process. The program is stored in, for example, a memory 1332 of the control device 1330. When the user operates a user interface 1333 of the control device 1330, the program can be read out and executed by the controller 1335. The program may be supplied to the controller 1335 via a network or a various kinds of storage media such as an external memory. The user interface 1333 may be, for example, a personal computer attached to the endoscope system 1300, or may be a touch panel. Alternatively, the display device 1340 may function as a part of the user interface 1333.

In accordance with a user operation, the controller 1335 transfers setting data of image capturing conditions such as an exposure condition in the photoelectric conversion device 100 to the photoelectric conversion device 100 via the signal transmission line 1323. The controller 1335 can also function as the signal processor 1331 that processes an image signal obtained by the photoelectric conversion device 100, thereby converting it into, for example, data which can be displayed as an image on the display device 1340. In the configuration shown in FIG. 13, a signal output from the camera module 1310 is processed in a part of the controller 1335, but the controller 1335 and the signal processor 1331 may be arranged independently. The image display data processed by the signal processor 1331 may be stored in the memory 1332 of the control device 1330.

The display device 1340 can be, for example, a liquid crystal display. The control device 1330 and the display device 1340 may be connected by a wire, or may be connected wirelessly. The display device 1340 can be used to display an image of the observation target in accordance with the signal obtained by the photoelectric conversion device 100. When observing a subject using the endoscope system 1300, the display device 1340 may also display setting information of each component included in the endoscope system 1300, for example, the image capturing condition of the photoelectric conversion device 100, or the like.

The light source device 1350 may be, for example, a light source that emits white light. Alternatively, the light source device 1350 may be a light source that emits red light or blue light other than white light. The light emitted by the light source device 1350 is not limited to visible light as long as the photoelectric conversion element 311 of the photoelectric conversion device 100 is sensitive to the color of the light. The light source device 1350 is configured to emit light of an appropriate wavelength in accordance with the observation target. The light source device 1350 emits light of a set color under the control of the controller 1335 of the control device 1330. Simultaneously, the photoelectric conversion device 100 performs image capturing under the control of the controller 1335 of the control device 1330. With this, the image of the observation target can be acquired.

When the circuit scale of the photoelectric conversion device 100 is suppressed as described above and the photoelectric conversion device 100 is miniaturized, the camera module 1310 can be miniaturized. Accordingly, the end portion 1324 of the endoscope 1320 to be inserted into the body cavity is miniaturized, so that the burden on a subject can be reduced. In a case in which the size of the end portion 1324 of the endoscope 1320 need not be changed, when the camera module 1310 is miniaturized, a margin is generated in the space that can be used for the insertion hole, storage hole, fluid passage, and the like described above, so that multifunctionality of the endoscope 1320 can be implemented.

Figure 14:
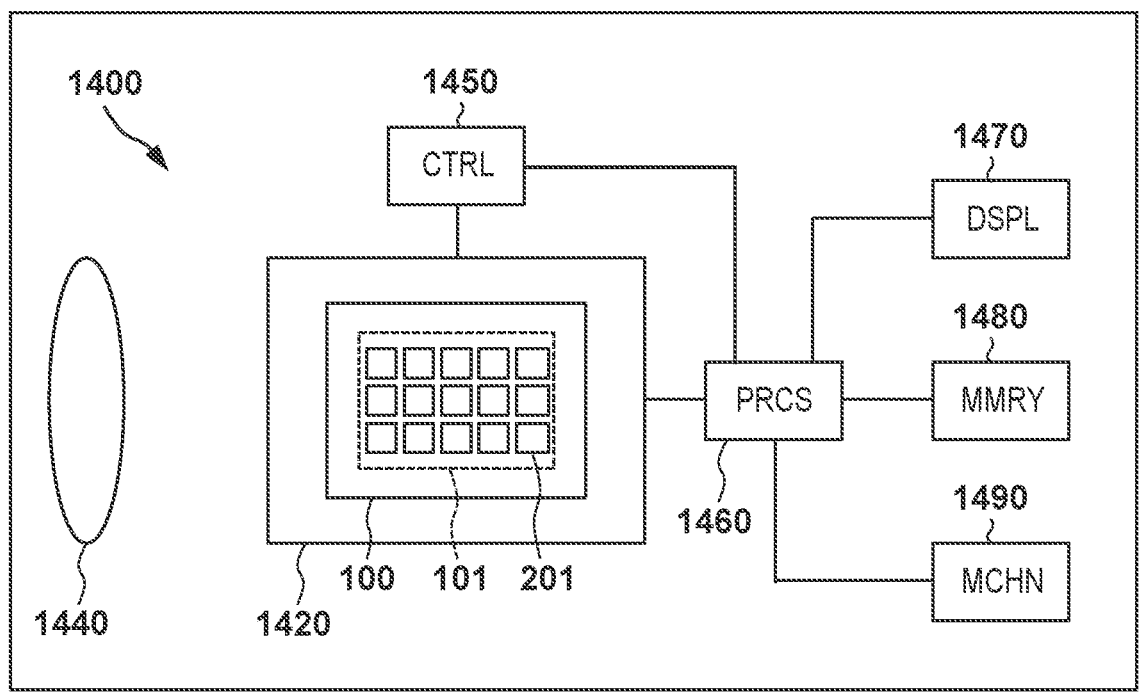
FIG. 14 is a view showing an example of the arrangement of an apparatus including the photoelectric conversion device shown in FIG. 1.

The application example of the photoelectric conversion device 100 is not limited to the camera module 1310, the endoscope 1320, and the endoscope system 1300 shown in FIG. 13. FIG. 14 is a schematic view for explaining an apparatus 1400 including the photoelectric conversion device 100 according to this embodiment. The photoelectric conversion device 100 can be accommodated in a package 1420, and mounted on the apparatus 1400. The package 1420 can include a base on which the photoelectric conversion device 100 is fixed, and a lid made of glass or the like facing the pixel array 101 of the photoelectric conversion device 100. The package 1420 can further include bonding members such as a bonding wire and bump for connecting a terminal of the base and an output terminal of the output unit 108 of the photoelectric conversion device 100.

The apparatus 1400 can include at least any of an optical device 1440, a control device 1450, a processing device 1460, a display device 1470, a storage device 1480, and a mechanical device 1490. The optical device 1440 is implemented by, for example, a lens, a shutter, and a mirror. The control device 1450 controls the photoelectric conversion device 100. The control device 1450 is, for example, a semiconductor device such as an ASIC.

The processing device 1460 functions as a signal processor that processes a signal output from the photoelectric conversion device 100. The processing device 1460 is a semiconductor device such as a CPU or ASIC for forming an Analog Front End (AFE) or a Digital Front End (DFE). The display device 1470 is an EL display device or liquid crystal display device that displays information (image) obtained by the photoelectric conversion device 100. The storage device 1480 is a magnetic device or semiconductor device that stores the information (image) obtained by the photoelectric conversion device 100. The storage device 1480 is a volatile memory such as an SRAM or DRAM or a nonvolatile memory such as a flash memory or hard disk drive.

The mechanical device 1490 includes a moving or propulsion unit such as a motor or engine. The apparatus 1400 displays the signal output from the photoelectric conversion device 100 on the display device 1470 and performs external transmission by a communication device (not shown) of the apparatus 1400. For this purpose, the apparatus 1400 may further include the storage device 1480 and the processing device 1460 in addition to the memory circuits and arithmetic circuits of the photoelectric conversion device 100. The mechanical device 1490 may be controlled based on the signal output from the photoelectric conversion device 100.

The apparatus 1400 is suitable for an electronic apparatus such as an information terminal (for example, a smartphone or a wearable terminal) having a shooting function, or a camera (for example, a lens interchangeable type camera, a compact camera, a video camera, or a surveillance camera). The mechanical device 1490 in the camera can drive the components of the optical device 1440 in order to perform zooming, an in-focus operation, and a shutter operation. Alternatively, the mechanical device 1490 in the camera can move the photoelectric conversion device 100 in order to perform an anti-vibration operation.

The apparatus 1400 can also be a transportation apparatus such as a vehicle, a ship, or a flying vehicle. The mechanical device 1490 in the transportation apparatus can be used as a mobile device. The apparatus 1400 as the transportation apparatus is suitable for the apparatus that transports the photoelectric conversion device 100, or the apparatus that assists and/or automates driving (steering) by a shooting function. The processing device 1460 for assisting and/or automating driving (steering) can perform processing for operating the mechanical device 1490 as a mobile device based on the information obtained by the photoelectric conversion device 100. Alternatively, the apparatus 1400 may be a medical apparatus such as an endoscope as described above, a measurement apparatus such as a distance measurement sensor, an analysis apparatus such as an electron microscope, an office apparatus such as a copy machine, or an industrial apparatus such as a robot.

According to the embodiment described above, the photoelectric conversion device 100 with a decreased circuit scale and suppressed power consumption is implemented. Hence, the value of the apparatus 1400 including the photoelectric conversion device 100 can be increased. This aforementioned "increase in the value" corresponds to at least one of addition of a function, improvement of performance, improvement of characteristics, improvement of reliability, improvement of production yield, reduction of an environmental load, cost reduction, size reduction, and weight reduction.

Therefore, using the photoelectric conversion device 100 according to this embodiment in the apparatus 1400 will improve the value of the apparatus. For example, by incorporating the photoelectric conversion device 100 in a transportation apparatus, the transportation apparatus will be able to have excellent performance when the outside imaging of the transportation apparatus is to be performed or when the external environment is to be measured. Hence, in the producing and selling of transportation apparatuses, determining to incorporate the semiconductor device according to this embodiment in a transportation apparatus will be advantageous in increasing the performance of the transportation apparatus itself. In particular, the photoelectric conversion device 100 is suitable for a transportation apparatus that uses information obtained by a photoelectric conversion device 100 to perform driving support and/or automated driving of the transportation apparatus.

The disclosure content of the present specification also includes a complement of the concept described in the present specification. That is, for example, if there is a description that "A is B" (A=B) in the present specification, the present specification shall disclose or suggest that "A is not B" even if a description that "A is not B" (A B) is omitted. This is because, if the description "A is B" is provided, it is premised that a case of "A is not B" is considered.

According to the present invention, it is possible to provide a technique advantageous in suppressing an increase in circuit scale and an increase in power consumption due to clock control, and miniaturizing a photoelectric conversion device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A photoelectric conversion device comprising:
a pixel array in which a plurality of pixels are arranged so as to form a plurality of rows and a plurality of columns;
a drive controller configured to drive the pixel array;
a horizontal transfer unit configured to sequentially output analog signals respectively output from a plurality of columns of the pixel array;
an AD converter configured to convert an analog signal output from the horizontal transfer unit into a digital signal;
a first clock generator configured to generate a clock signal used to control an operation of the drive controller; and
a second clock generator configured to generate a clock signal used to control the horizontal transfer unit and the AD converter, wherein
a clock tree in which a clock signal is distributed from the first clock generator and a clock tree in which a clock signal is distributed from the second clock generator form clock trees different from each other.

2. The photoelectric conversion device according to claim 1, wherein
the drive controller causes the pixel array to output an analog signal, and transfers, to the horizontal transfer unit, a horizontal transfer control signal indicating a period for outputting an analog signal from the pixel array, and
the horizontal transfer unit starts to output, to the AD converter, an analog signal output from the pixel array in accordance with the horizontal transfer control signal and in synchronization with a clock signal supplied from the second clock generator.

3. The photoelectric conversion device according to claim 1, wherein
the drive controller transfers, to the second clock generator, an image capturing control signal indicating an image capturing period for performing image capturing in the pixel array, and
in accordance with the image capturing control signal, the second clock generator starts to generate a clock signal used to control the AD converter.

4. The photoelectric conversion device according to claim 3, wherein
based on the image capturing control signal, the AD converter starts an operation of converting an analog signal into a digital signal.

5. The photoelectric conversion device according to claim 1, wherein
the AD converter samples an analog signal, which has been output from the horizontal transfer unit in synchronization with a clock signal supplied from the second clock generator, after a predetermined time has elapsed from an edge of the clock signal which has triggered output of the analog signal.

6. The photoelectric conversion device according to claim 1, wherein
the horizontal transfer unit comprises a shift register in which a plurality of registers are connected in series, and an output of a last-stage register of the plurality of registers is connected to an input of a first-stage register of the plurality of registers, and
in the shift register, a pulse makes one cycle from the first-stage register to the last-stage register in one horizontal transfer period for transferring signals corresponding to one row of the pixel array.

7. The photoelectric conversion device according to claim 6, wherein
number of the plurality of registers is defined by number of pixels, among the plurality of pixels, from which signals are transferred in the one horizontal transfer period, and a horizontal synchronization period.

8. The photoelectric conversion device according to claim 1, wherein
each of the plurality of pixels comprises a photoelectric conversion element, and
not less than two photoelectric conversion elements share a floating diffusion.

9. The photoelectric conversion device according to claim 6, wherein
each of the plurality of pixels comprises a photoelectric conversion element,
not less than two photoelectric conversion elements share a floating diffusion, and
number of the plurality of registers is defined by number of pixels, among the plurality of pixels, from which signals are transferred in the one horizontal transfer period, a horizontal synchronization period, and number of photoelectric conversion elements arranged in a row direction among the not less than two photoelectric conversion elements sharing the floating diffusion.

10. The photoelectric conversion device according to claim 1, further comprising an oscillator,
wherein each of the first clock generator and the second clock generator generates a clock signal based on an output of the oscillator.

11. The photoelectric conversion device according to claim 1, wherein
each of the first clock generator and the second clock generator comprises an oscillator configured to generate a clock signal.

12. The photoelectric conversion device according to claim 1, wherein
the second clock generator supplies clock signals of different frequencies to the horizontal transfer unit and the AD converter, respectively, based on a reference clock signal in the second clock generator.

13. The photoelectric conversion device according to claim 12, wherein
a frequency of a clock signal supplied from the second clock generator to the AD converter is higher than a frequency of a clock signal supplied from the second clock generator to the horizontal transfer unit.

14. The photoelectric conversion device according to claim 12, wherein
the second clock generator supplies the reference clock signal to the AD converter, and supplies a clock signal obtained by dividing the reference clock signal to the horizontal transfer unit.

15. The photoelectric conversion device according to claim 1, wherein
a frequency of a clock signal supplied to the AD converter by the second clock generator is higher than a frequency of a clock signal supplied to the drive controller by the first clock generator.

16. The photoelectric conversion device according to claim 1, wherein
a frequency of a clock signal supplied to the horizontal transfer unit by the second clock generator is higher than a frequency of a clock signal supplied to the drive controller by the first clock generator.

17. The photoelectric conversion device according to claim 1, wherein
the AD converter is a successive-approximation type AD converter.

18. The photoelectric conversion device according to claim 1, further comprising a digital signal processor configured to perform digital signal processing on a digital signal output from the AD converter,
wherein the digital signal processor is supplied with a clock signal from the second clock generator via the AD converter.

19. A camera module comprising:
the photoelectric conversion device according to claim 1; and
an optical system configured to allow light to enter the photoelectric conversion device.

20. An endoscope comprising:
the camera module according to claim 19; and
a cable configured to transmit a signal output from the camera module.

21. An endoscope system comprising:
the endoscope according to claim 20; and
a signal processor connected to the cable, and configured to process a signal output from the camera module.

22. An apparatus comprising:
the photoelectric conversion device according to claim 1; and
a signal processor configured to process a signal output from the photoelectric conversion device.

* * * * *